INVENTOR.
OREY W. OERMAN

Aug. 5, 1958 O. W. OERMAN 2,845,853
COMBINED LEVELING AND GAUGE WHEEL CONTROL FOR PLOWS
Filed April 28, 1954 3 Sheets-Sheet 2
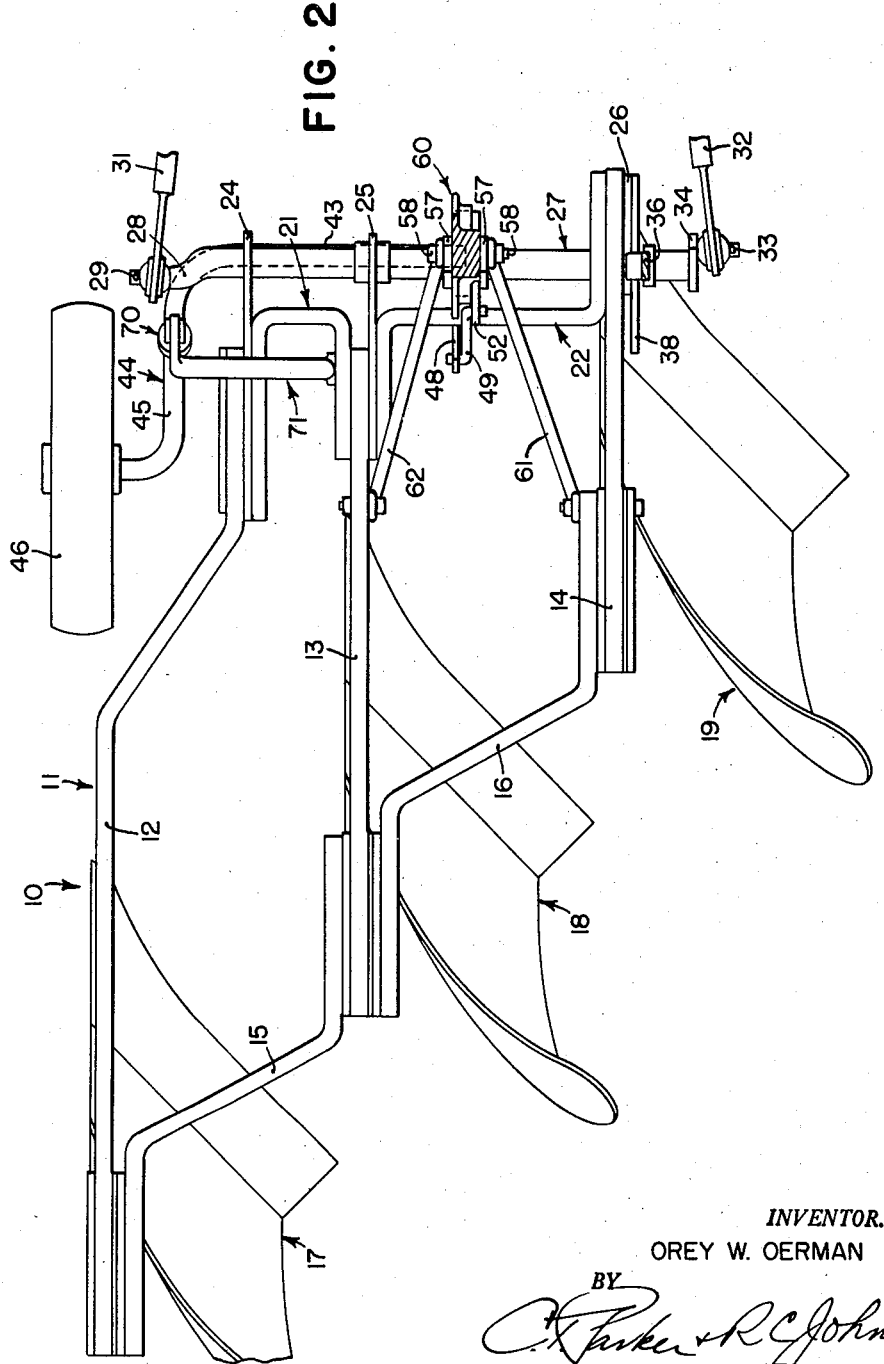
INVENTOR.
OREY W. OERMAN
BY
ATTORNEYS Aug. 5, 1958     O. W. OERMAN     2,845,853
COMBINED LEVELING AND GAUGE WHEEL CONTROL FOR PLOWS
Filed April 28, 1954     3 Sheets-Sheet 3
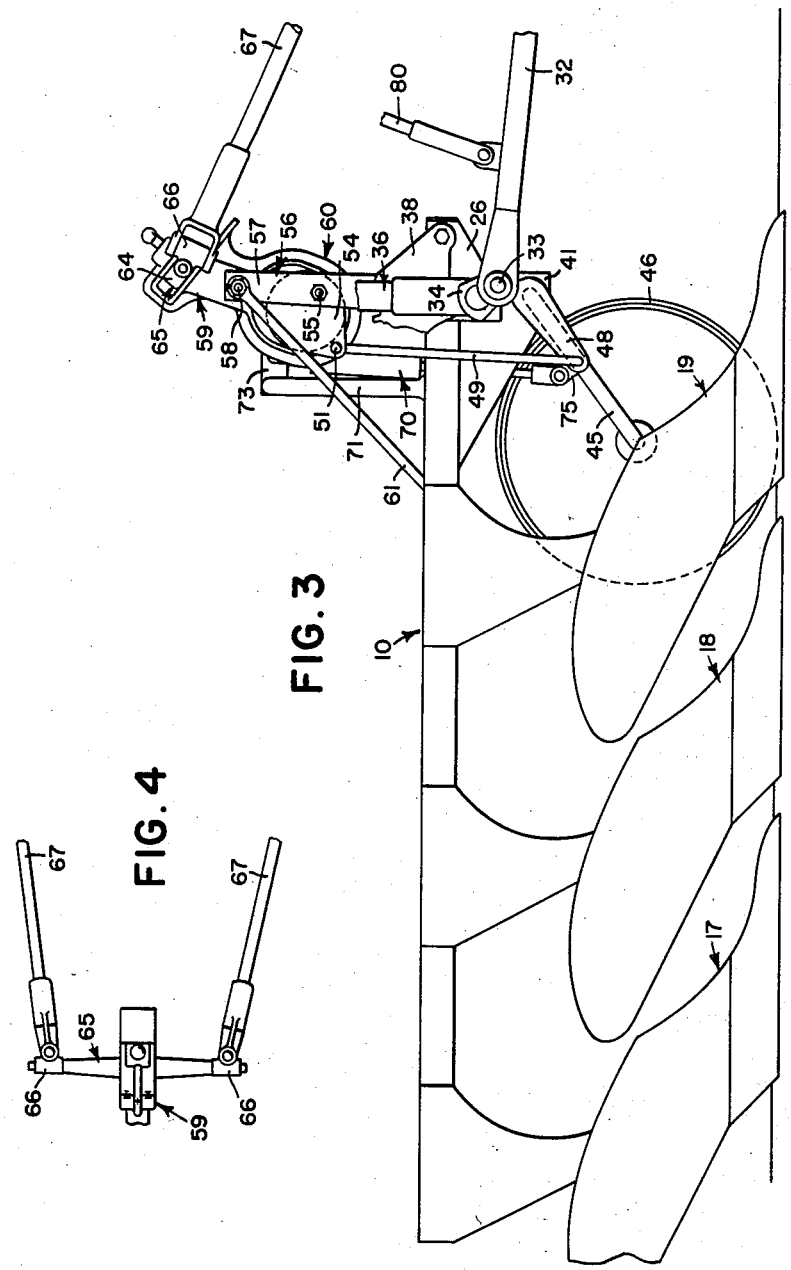
INVENTOR.
OREY W. OERMAN
ATTORNEYS United States Patent Office 2,845,853
Patented Aug. 5, 1958

2,845,853

COMBINED LEVELING AND GAUGE WHEEL CONTROL FOR PLOWS

Orey W. Oerman, Moline, Ill., assignor to Deere & Company, Moline, Ill., a corporation of Illinois Application April 28, 1954, Serial No. 426,170

2 Claims. (Cl. 97—46.27)

The present invention relates generally to agricultural implemeints and more particularly to ground-working implements, such as plows or the like, of the type that are adapted to be connected to and carried by a farm tractor of the type having upper and lower hitch links.

The object and general nature of the present invention is the provision of a tractor-carried implement having ground-engaging gauge means and a movable hitch link-receiving part connected to be shifted simultaneously with the adjusting of the gauge means. More specifically, it is a feature of this invention to provide a swingably mounted part on the upper portion of the implement frame, generally at the front end thereof, to receive the upper or thrust link means, and means operated by the ground-engaging gauge means for automatically shifting said part at the same time that the gauge means is adjusted, such as for operating at different depths.

A further feature of this invention is the provision of an implement having a vertically adjustable ground-engaging gauge means, and, connected to be operated simultaneously therewith, a hitch-shifting member, whereby one operating means may be employed for adjusting the position of the gauge means and the upper hitch-receiving member.

These and other objects and advantages of the present invention will be apparent to those skilled in the art after a consideration of the following detailed description, taken in conjunction with the accompanying drawings, in which:

Fig. 2 is a plan view of the implement shown in Fig. 1.

Fig. 3 is a view similar to Fig. 1, showing positions the various parts, particularly the swingable link-receiving part on the upper end of the mast, take so as to hold the plow level when the gauge wheel adjusting means has been actuated to force the gauge wheel down and thus raise the plow to a position of shallow plowing.

Fig. 4 is a fragmentary plan view of the rear portion of the upper link means.

Figure 1:
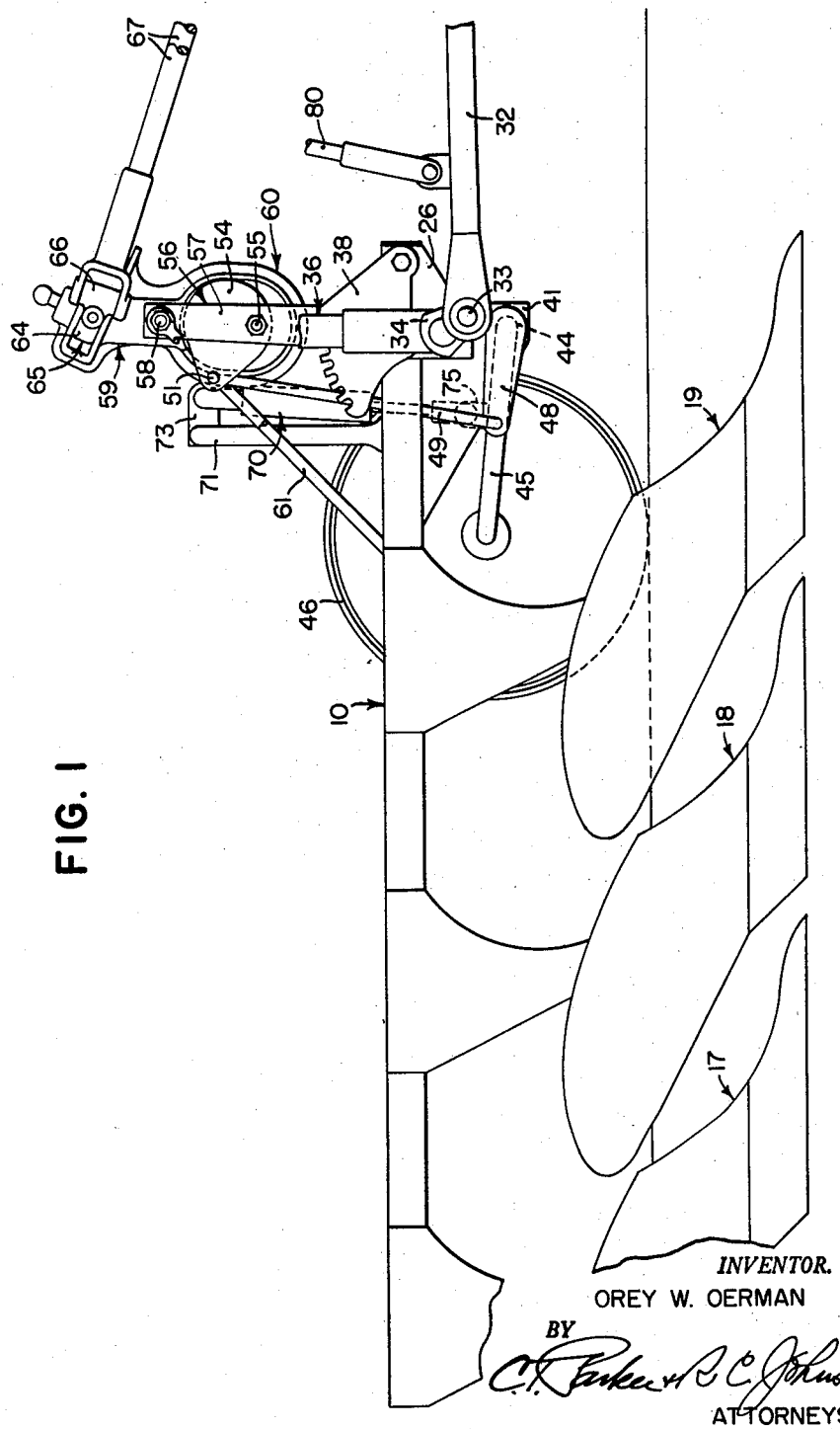
Fig. 1 is a side view of an agricultural implement in which the principles of the present invention have been incorporated.

The implement in which the principles of the present invention have been incorporated is indicated in its entirety by the reference numeral 10 and includes frame means in the form of a frame structure 11 comprising, in part, a plurality of plow beams 12, 13 and 14 interconnected by suitable braces 15 and 16 at the rear ends of the beams 12—14 and receiving furrow openers 17, 18 and 19, preferably in the form of moldboard plows. Front brackets 21 and 22 form the front portion of the frame means 11 and connected with the brackets 21 and 22 and the front ends of the associated beams are a plurality of forwardly extending bracket plates 24, 25 and 26, which bracket plates are apertured to rockably receive a cross shaft 27, the left end of which includes an offset section 28 having a reduced end 29 that forms means adapted to receive the rear end of the left-hand draft link 31. The right-hand draft link 32, said draft links normally being connected with the associated tractor, is connected to a stud 33 that is carried by a short arm 34 secured, as by welding, to the right end of the cross shaft 27. The stud 33 and arm 34 form a second section offset generally oppositely relative to said offset section 28. A hand lever 36 is connected at its lower end to the shaft 27 and operates in connection with a sector member 38 to lock the shaft 27 against rocking movement.

The bracket plates 24 and 25 are extended downwardly, as at 41 (Fig. 1), and apertured to receive the shaft portion 43 of a gauge wheel crank axle member 44, the left end 45 of which extends generally rearwardly and is turned laterally outwardly to rotatably receive a gauge wheel 46. The laterally inner end of the crank axle 44 carries an arm 48 that extends generally parallel with respect to the laterally outer gauge wheel receiving crank axle section 45. The outer-end of the arm 48 is apertured to receive the lower end of a link 49 the upper end of which is turned laterally outwardly, as indicated at 51, and is connected to an arm section 52 that is formed on and serves as a part of a cam member 54 pivotally mounted, as at 55, on the upper portion of a mast section 56 that is connected to and forms a part of the implement frame 10, the mast section 56 thus forming a rigid upwardly disposed frame extension.

Preferably, the mast section 56 comprises a pair of vertically extending bars 57 apertured at their lower ends to receive the cross shaft 27 and apertured at their upper portions to receive a transverse bolt 58 that serves to connect a pair of brace rods 61 and 62 extending from the associated beam members 13 and 14 upwardly to the mast section 56. The bolt means 58 also serves as pivotal supporting means for pivotally connecting a swingable part 59 at its mid-point to the upper portion of the mast section 56. The lower portion 60 of the swingable member 59 is formed as a yoke and snugly receives the eccentric portion of the cam member 54. The upper portion of the rockable member 59 is pivotally connected to the central portion 64 of a short evener bar 65, the end portions of which are swivelly connected, as at 66, to the rear ends of a pair of link members 67 that, taken together, constitutes an upper thrust link means connecting the mast section 56 with the associated tractor.

A hydraulic jack, indicated in its entirety by the reference numeral 70, is provided for controllably actuating the crank axle 44. As best shown in Fig. 1, an upstanding bracket 71 is carried at the front portion of the implement frame means and at its upper end carries a lug 73 that pivotally receives the upper end of the hydraulic jack unit 70. The lower end of the unit 70 is connected to a lug 75 carried on the crank section 45 of the gauge wheel crank axle 44. Any suitable means, such as a pair of hoses (not shown), is provided for controllably delivering liquid under pressure to one end of the cylinder 70, the piston section of which is forced downwardly, which raises the front portion of the frame 11 relative to the ground. The resulting rocking of the crank axle 44 acts simultaneously through the link 49 to rock the cam member 54. The parts are so arranged and proportioned, as shown in Fig. 3, that rocking of the member 56 as a result, for example, of a given displacement generally vertically of the gauge wheel 46, results in a fore-and-aft rocking of the member 59 in such amount and direction that the plow 10 is caused to remain level at the new depth of operation. Fig. 3 shows how, when the power operated jack 70 has been extended to lower the gauge wheel, and thus raise the plow, into a position of shallow depth, the resulting rocking of the swingable part 59, pivoted to the top of the mast 56 and receiving the rear end of the upper thrust link means 67 as described above, acts in effect to tilt the plow backwardly by an amount that compensates for swinging of the plow as a unit about the vertical hitch point that lies at the convergence of the lines of the links 32 and 67 extended forwardly.

The plow is thus maintained level with the ground whether in deep plowing position, as shown in Fig. 1 or in extreme shallow plowing position, as shown in Fig. 3, and in all intermediate positions, by the tilting or rocking of the part 59 that occurs automatically whenever the power unit 70 is actuated to shift the gauge wheel. At all other times the power unit 70 holds the gauge wheel in fixed position relative to the plow frame.

The lower draft links 31 and 32 of the tractor are connected to be operated together by the power lift system of the tractor, such system including a rockshaft and lift arms (not shown) connected with downwardly extending links 80, the lower portions of which are pivoted to the draft links 31 and 32, this being presently conventional construction, such as that shown in U. S. Patents 2,118,180 and 2,437,875 issued to Ferguson and Chambers et al., respectively. In a gauge wheel plow, as shown, the tractor power lift system of the tractor is ordinarily arranged so that the plow may swing within limits with relative freedom about the virtual hitch point as defined by the links 32 and 67.

While I have shown and described the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In an implement adapted to be connected with a tractor having upper and lower, generally fore-and-aft extending hitch links, frame means including a rigid upwardly disposed frame extension rigid with the remainder of the frame means, a part disposed in a generally vertical position and pivoted at a mid-point to the upper portion of said frame extension and having means at its upper end to pivotally receive the upper of said links, the lower portion of said part constructed to constitute a yoke, a second part in the form of a rotatable cam disposed within said yoke and pivoted to said extension below the pivot of said first part, and means connected with said second part to rock said first part on said frame extension so as to vary the position of said upper link relative to the implement frame.

2. In an implement adapted to be connected with a tractor having upper and lower, generally fore-and-aft extending hitch links, frame means including a rigid upwardly disposed frame extension rigid with the remainder of the frame means, a part disposed in a generally vertical position and pivoted to the upper portion of said frame extension and having means spaced generally vertically from the pivot axis of said part to pivotally receive the upper of said links, a gauge wheel crank axle swingably connected with said frame means and carrying a ground engaging gauge wheel, a power unit connected between said frame means and said crank axle for shifting said gauge wheel in either upward or downward direction to lower or raise the frame means relative to the ground, and means connected between said crank axle and said part for varying the position of said upper link in accordance with the change in the position of the gauge wheel, so as to hold the plow substantially level at different depths of operation relative to the implement frame.

References Cited in the file of this patent

UNITED STATES PATENTS

| | | |
|---|---|---|
| 1,637,811 | Ferguson | Aug. 2, 1927 |
| 2,366,155 | Silver | Jan. 2, 1945 |
| 2,386,378 | Wippel | Oct. 9, 1945 |
| 2,445,260 | Brimhall | July 13, 1948 |
| 2,518,363 | Orelind | Aug. 8, 1950 |
| 2,608,145 | Knapp | Aug. 26, 1952 |
| 2,627,797 | Acton | Feb. 10, 1953 |
| 2,637,259 | Acton | May 5, 1953 |
| 2,673,505 | Altgelt | Mar. 30, 1954 |
| 2,687,681 | Phenice | Aug. 31, 1954 |
| 2,704,015 | Wilson | Mar. 15, 1955 |
| 2,704,496 | Taylor | Mar. 22, 1955 |
| 2,713,296 | Silver et al. | July 19, 1955 |

FOREIGN PATENTS

| | | |
|---|---|---|
| 599,020 | Great Britain | Mar. 3, 1948 |
| 138,680 | Sweden | Jan. 7, 1953 |